(12) United States Patent
Möseneder et al.

(10) Patent No.: US 6,774,607 B2
(45) Date of Patent: Aug. 10, 2004

(54) CHARGER CONNECTED TO A LOAD VIA A SWITCHING CIRCUIT TO PREVENT AN INCORRECT POLARITY CONNECTION

(75) Inventors: Josef Möseneder, Bad Wimsbach (AT); Andreas Trinkl, Nussbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 10/312,614

(22) PCT Filed: Jun. 12, 2001

(86) PCT No.: PCT/AT01/00193

§ 371 (c)(1),
(2), (4) Date: Mar. 31, 2003

(87) PCT Pub. No.: WO02/01694

PCT Pub. Date: Jan. 3, 2002

(65) Prior Publication Data

US 2003/0164694 A1 Sep. 4, 2003

(30) Foreign Application Priority Data

Jun. 28, 2000 (AT) .......................................... 1111/2000

(51) Int. Cl.[7] .................................................. H02J 7/16
(52) U.S. Cl. ..................................................... 320/165
(58) Field of Search ............................... 320/165, 10.5, 320/167; 361/84, 85, 92, 90, 56, 91, 77; 307/127

(56) References Cited

U.S. PATENT DOCUMENTS 5,434,739 A * 7/1995 Heck ............................ 361/84

6,154,081 A * 11/2000 Pakkala et al. ............ 361/91.1
6,331,763 B1 * 12/2001 Thomas et al. ............. 320/136

FOREIGN PATENT DOCUMENTS

| DE | 40 31 288 | 11/1991 |
| DE | 197 17 527 | 10/1998 |
| DE | 197 56 825 | 7/1999 |
| EP | 0 629 031 | 5/1994 |

* cited by examiner

Primary Examiner—Pia Tibbits
(74) Attorney, Agent, or Firm—Collard & Roe, P.C.

(57) ABSTRACT

The invention relates to an electronic circuit for a power supply device (1), in particular for a charger (2) for accumulators (3), in which the power supply device (1) is connected via input terminals (4, 5) to a power source (6), the power supply device (1) converting the supplied power from any voltage, in particular an AC voltage, into a DC voltage and this transformed power is forwarded via output terminals (7, 8) to a consumer (9), in particular the accumulator (3), in which, a switching element (10) is provided as a means of operating polarity reversal protection. The switching element (10) is disposed between at least one output terminal (7, 8) and a potential, in particular a negative potential, of the power supply device (1) and if a specific polarity appears at this output terminal (7, 8) the switching element (10) is connected through and if an opposite (incorrect) polarity appears it is switched off. The output terminals (7, 8) are disconnected separated from the input terminals (4, 5), in particular from the power source (6), by the power supply device (1).

15 Claims, 2 Drawing Sheets

CHARGER CONNECTED TO A LOAD VIA A SWITCHING CIRCUIT TO PREVENT AN INCORRECT POLARITY CONNECTION

CROSS REFERENCE TO RELATED APPLICATIONS

Applicants claim priority under 35 U.S.C. §119 of AUSTRIAN Application No. A 1111/2000 filed on Jun. 28, 2000. Applicants also claim priority under 35 U.S.C. §365 of PCT/AT01/00193 filed on Jun. 12, 2001. The international application under PCT article 21(2) was not published in English.

The invention relates to a charger device connected to an accumulator and combined with a protection circuit for reverse polarity and overload protection, and a method of controlling the power supply device.

Patent specification DE 197 56 825 A1 describes a polarity reversal protection circuit with a switching element disposed between an input terminal and an output terminal, which does not allow a current flow unless the voltage at the input terminal is of a certain polarity. If a specific polarity is applied to the input terminal, the switching element connects through and if the polarity is not correct, it is opened or deactivated. The disadvantage of this system is that there is protection on the input side only.

An electronic circuit with polarity reversal protection is also known from patent specification DE 197 17 527 A1, in which a switching element, in particular a MOS field-effect transistor, is connected between an input source connected to a DC voltage source and a downstream circuit structure, and the switching element is activated if the DC voltage source is at the correct polarity and deactivated if the polarity is not correct. Again, the disadvantage of this approach is that there is protection on the input side only.

Patent specification DE 40 31 228 C1 discloses a circuit designed to protected against incorrect polarity, in which a field-effect transistor (FET) is disposed between a DC voltage supply source (Q) and a consumer (V) in the positive or negative line. The gate terminal of the field-effect transistor is always connected via a diode (D1) to the antipole or the line in which the field-effect transistor is not disposed. If a situation arises in which the polarity is not correct, a clearing current (IA) flows across the diode (D1), as a result of which the gate capacitance is discharged at the FET and the field-effect transistor is switched off with virtually no delay. Once the DC voltage source is correctly polarized again, the field-effect transistor is charged with the gate source capacitance again because the diode DI is now in the locked position so that the gate capacitance of the FET can be re-charged and the consumer current IV is able to flow across it again. The disadvantage of this solution is that the circuit design can be used to protect against incorrect polarity only and can not be used to provide other safety features.

The object of the invention is to provide a charger connected to an accumulator and a method of controlling the power supply, which will protect the power supply on the output side, such as a polarity reversal protection, an overload protection and/or a load detection system.

This object is achieved by the invention due to the fact that a control mode of a first switching element in the protection circuit is connected to another switching element to which a negative potential of the charger device can be switched, or to a control output of a control device of the charger device, and the control mode is also connected to a positive potential of a supply voltage source. The switched state of the first switching element is determined by the switched state of the other switching element. The advantage of this approach is that a circuit design of this type does not require a counter voltage to charge an accumulator, which enables fully discharged accumulators to be charged. Another advantage resides in the fact that not only can a charger device of this type be used to charge accumulators, it can also be used to supply energy for another consumer because other safety features can be run in addition to polarity reversal protection, such as overload protection and a load detection system, for example.

The object is also achieved by a method in which, when the charger device is connected to the power source, the first switching element for the polarity reversal protection is activated, even if the accumulator is not connected, and if the opposite (incorrect) polarity appears at the output terminals, another switching element is activated, as a result of which the voltage applied to a control node of the first switching element is applied to the negative potential, thereby switching off or deactivating the first switching element.

The invention will be explained in more detail with reference to presently preferred embodiments.

In the drawings.

Firstly, it should be noted that the same parts operating in an equivalent manner are denoted by the same reference numerals in both figures.

Figure 1:
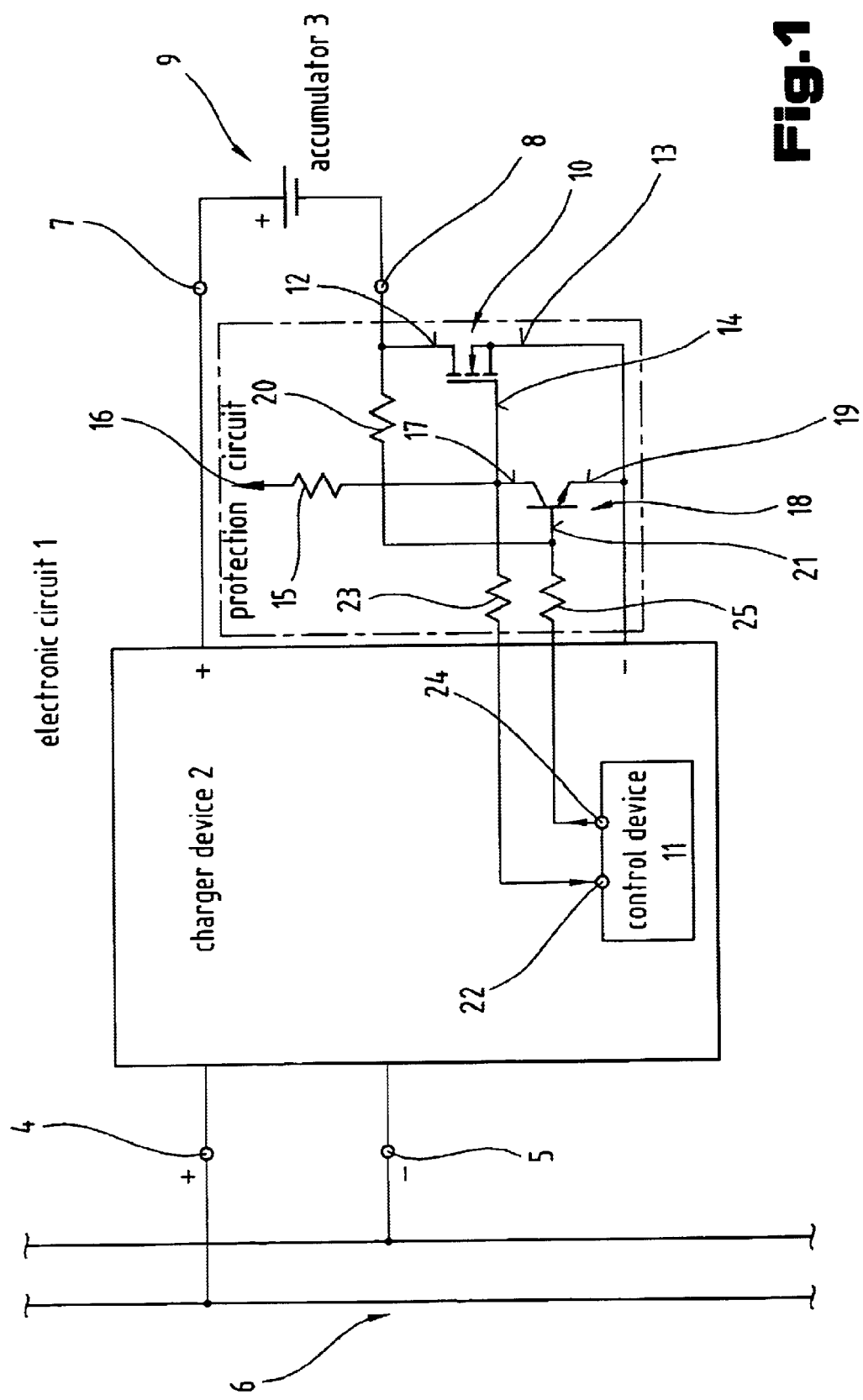
FIG. 1 is a simplified circuit diagram illustrating one embodiment of the invention.
Figure 2:
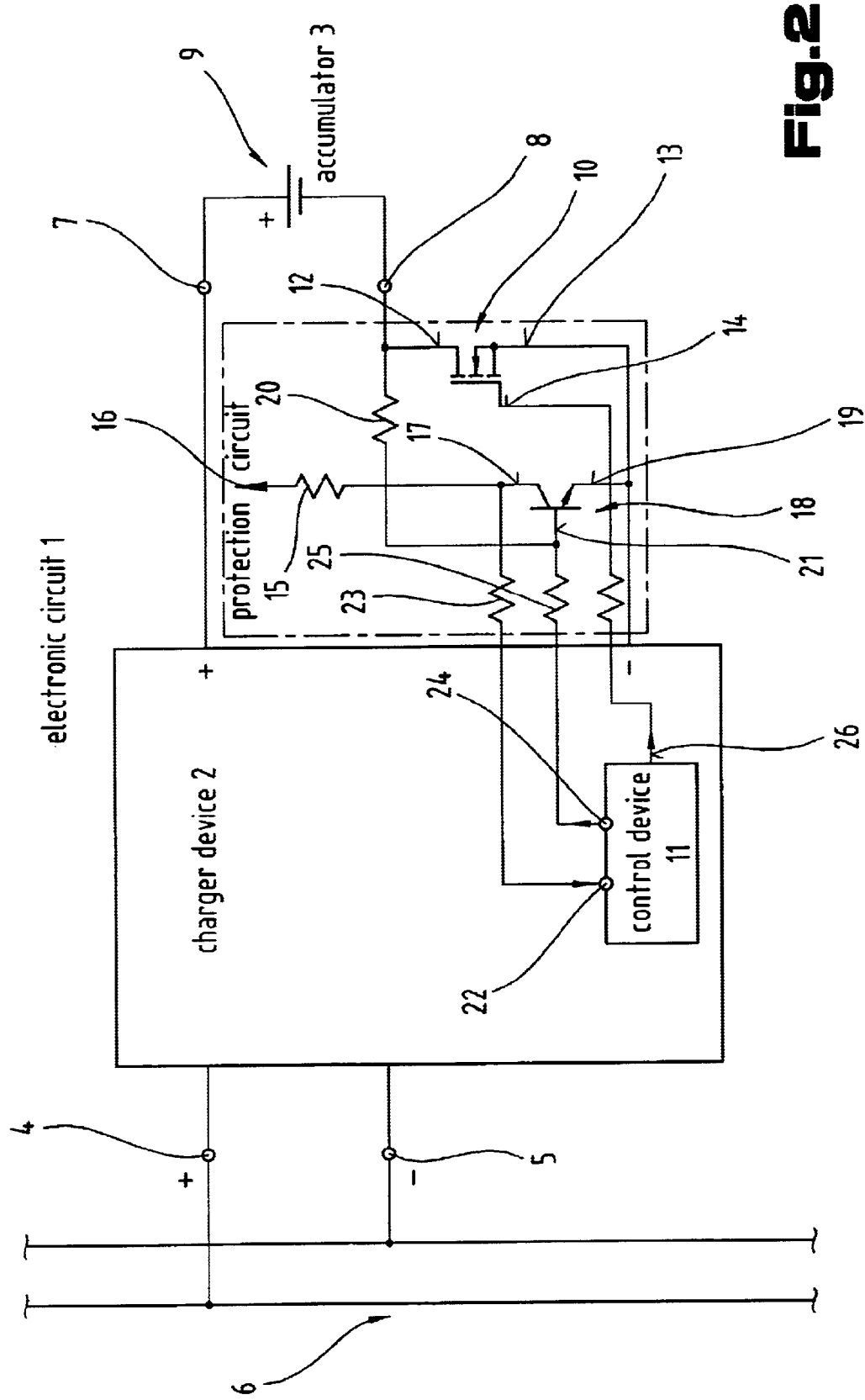
FIG. 2 is a simplified circuit diagram illustrating another embodiment of the invention.

FIGS. 1 and 2 illustrate an electronic circuit for a charger 1, comprising a charger device 2 for an accumulator 3. The charger 2 is symbolically illustrated by a simple block, and the circuit design may be any system known from the prior art. For example, the charger 1 might be used as an inverter source or the like.

The charger device 2 for accumulator 3 is connected to a power source 6, in particular a mains network, by input terminals 4, 5. The charger 1 converts the input energy from an AC voltage into a DC voltage and delivers this converted power, i.e. the DC voltage, by output terminals 7, 8 to a consumer 9, so that the consumer 9, in particular an ohmic consumer 9, can be supplied with power, and accumulator 3 can be charged.

It should also be pointed out that by means of the protection circuit, which is outlined by dot-dashed lines, the charger 1 is able to run several functions, in particular polarity reversal protection, overload protection and/or load detection. The individual functions will be described in more detail below. In the illustrated embodiments, the electronic circuit is designed for a specific potential, in particular the negative potential, although it would also be possible to operate on the basis of a different potential, in particular a positive potential.

As illustrated in FIG. 1, a switching element 10 is provided between the output terminal 8 for the negative potential of the charger device 2 for the consumer 9, and if a negative polarity is applied to output terminal 8, the switching element 10 is switched on and if the opposite (incorrect) polarity, in other words positive polarity, appears, it is switched off, the switching function of the control device 11 of the charger device 2 being operated automatically, as will be described below. The output terminals 7, 8 are disconnected from the input terminals 4, 5 of the power supply source 6, by means of the charger device 2, so that the individual possible functions, in particular polarity reversal protection, overload protection and/or load detection, operate on the output side.

Connected to the output terminal 8 for the preferably negative potential is a drain node 12 of the switching element 10, in particular a MOS field-effect transistor. Another node 13 of the switching element 10 is connected to the negative potential. The through connection of the switching element 10 is therefore connected between the output terminal 8 and the negative potential, of the power supply device 1 and if a specific polarity appears at the output terminal 8, the through connection is switched on whereas if the opposite (incorrect) polarity appears at the output terminal 8, the through connection is switched off.

A control node 14, in particular a gate node, of the switching element 10 is connected to a voltage, in particular a positive supply voltage 16, preferably by a resistor 15, as schematically illustrated. This connection may be set up so that the control node 14 is connected to the output terminal 7, or a voltage of an independent power source. The key factor is that the control node 14 is powered or supplied by a permanent voltage which is not interrupted by a switch element, i.e. the control node 14 of the switching element 10 is continuously supplied with voltage, preferably a positive voltage. As a result, when this voltage is applied to the control node 14, the switching element 10 is automatically activated, i.e. when this voltage, in particular the supply voltage 16, is applied, the switching element 10 is activated without a consumer 9 having to be connected to the output terminals 7, 8.

The control node or gate 14 of the switching element 10 is connected to a node 17, in particular a collector node, of another switching element 18, in particular a transistor. Another node 19, in particular an emitter node, of the other switching element 18 is connected to the negative potential. The through connection, in particular the collector-emitter connection, of the other switching element 18 is therefore disposed between the control node 14 of the first switching element 10, and the preferably negative potential.

The drain node 12 of the first switching element 10 is connected to the output terminal 8 and preferably by a resistor 20 to a control node 21 of the other switching element 18 so that a corresponding voltage can be applied in order to activate the other switching element 18 connected to the output terminal 8 by the control node 21 of the other switching element 18. The control node 21 is also connected to output terminal 24 of the control device 11 of the charger device 2, which is schematically indicated by a block and preferably is a microprocessor. The control node 14 of the first switching element 10 and node 17 of the second switching element 18 are also connected to input terminal 22 of the control device 11.

The essential feature of the electronic circuit proposed by the invention is that the first switching element 10 can also be activated when the power supply device 1 is switched on, even if no consumer 9, such as accumulator 3, is connected. This is possible because the control node 14 of the first switching element 10 is permanently supplied with voltage so that, once this voltage has built up, it is automatically able to activate the first switching element 10.

As a result of this build-up, the switching element 10 is activated with a specific polarity at the output terminals 7, 8 when the consumer 9 is connected, even if no power supply source 6 is connected to the input terminals 4, 5 or the voltage applied to the gate node is activated when the control node 14 of the first switching element 10 is connected to the output voltage, in particular the other output terminal 7, instead of the supply voltage 16 because this causes a corresponding accumulator voltage to appear at the control node 14 of the first switching element 10. Consequently, the polarity reversal protection is active even without power supply source 6 connected to the input terminals 4, 5, thereby preventing damage to the components if the accumulator 3 is incorrectly connected to the output terminals 7, 8 when the charger 1 is not in operation.

The operation of the charger device combined with the protection circuit will be described in more detail below. As explained above, the charger device 2 is connected by input terminals 4, 5 to the power supply source 6, and the supplied power is converted from an AC voltage to a DC voltage. This converted power is delivered by output terminals 7, 8, which are separated from the input terminals 4, 5 by components such as diodes or a transformer, etc., to the consumer 9, i.e. the accumulator 3. When the charger device 2 is connected to the power supply source 6, the switching element 10 between the output terminal 8 and the negative potential of a voltage, in particular the supply voltage 16 or an output voltage of the charger device 2 or an independent voltage is activated, establishing an electrical connection between output terminal 8 and the negative potential. As a result of establishing a connection between the output terminal 8 and the negative potential, the polarity reversal protection, the overload protection and/or the load detection become operative because a current circuit can be established by the charger device 2 across the two output terminals 7, 8.

The polarity reversal protection is operated in such a way that, if an external voltage source is applied to the output terminals 7, 8 with a negative polarity at the output terminal 8 connected to the accumulator 3, the switching element 10 remains switched on whereas if the accumulator 3 is connected to the output terminal with the opposite, i.e. positive polarity, the switching element 10 is switched off or deactivated. The way in which this operates is that, if the output terminals 7 and 8 are at the opposite (incorrect) polarity, the other switching element 18 is activated so that the supply voltage 16 appearing at or delivered to the control node 14 of the first switching element 10 is applied to the negative potential and the first switching element 10 is therefore deactivated, i.e. because the polarity at the output terminal 8 is opposite (incorrect), in this case positive, the voltage applied by the connecting line between the output terminal 8 and the control node 21 of the second switching element 18 is forwarded to the latter so that the other switching element 18 is activated and the first switching element 10 is deactivated by the connection established between the control node 14 and the negative potential. The first switching element 10 remains deactivated until the opposite (incorrect) polarity of the voltage of the accumulator 3 at the output terminals 7, 8 is interrupted so that the supply voltage at the control node 21 of the other switching element 18 is also interrupted, thereby deactivating the other switching element 18 again and the supply voltage 16 at the control node 14 of the first switching element 10 can be built up again, enabling the first switching element 10 to be automatically activated.

It should be pointed out that not just accumulators 3 can be connected to the output terminals 7, 8. Naturally, it would also be possible to connect an ohmic resistance or other circuit components which need to be supplied with power from the charger device 2. However, if no accumulator 3 is connected, it will not be possible to operate polarity reversal protection and the electronic circuit will then only be able to run the overload protection and/or load detection functions.

The overload protection prevents too high a flow of current across the first switching element 10, which could damage the switching element 10. In the case of an accumulator 3, too high a flow of current might occur if the latter were totally or almost totally discharged.

In the case of the overload protection, in other words when connecting an empty or almost empty accumulator 3 or another consumer 9 with a high current uptake to the output terminals 7, 8, the first switching element 10 is deactivated by the second switching element 18, even if the consumer 9 or the accumulator 3 is at a specific (correct) polarity. The way this is operated is that, as a result of too high a current flow, a corresponding voltage appears via the resistor 20 at the control node 21 of the other switching element 18 so that, when a specific level is exceeded, the other switching element 18 is activated, thereby deactivating the first switching element 10 in the manner described above with respect to the polarity reversal protection. The permissible current flow across the first switching element 10 can be defined on the basis of the rating of the resistor 20 in the connecting line to the control node 21 of the second switching element 18 and the rating of the switching element 10.

When the overload protection is in operation when an accumulator 3 is being used as the consumer 9, the first switching element 10 is periodically switched on and off until the current flow being established across the first switching element 10 falls below a defined value and the voltage appearing at the control node 21 of the other switching element 18 also falls below a pre-defined value, preventing the other switching element 18 from being activated. The switching element 10 is periodically switched on and off because whenever the first switching element 10 is activated, the empty or almost empty accumulator 3 connected to it is charged for a brief period, thereby reducing the current level over time and enabling permanent charging.

In order to enable this periodic switching on and off, however, the control device 11 must intervene accordingly, i.e. the second switching element 18 must be purposely deactivated by the control device 11 so that the first switching element 10 is activated again. To do this, however, it is necessary for the control device 11 to detect the switched state of the first and second switching elements 10 and 18. This is achieved by coupling a control input 22 of the switching device 11 with the control node 14 of the first switching element 10 and with the collector node of the second switching element 18 via a resistor 23, so that when the second switching element 18 is activated, the supply voltage 16 appearing at the control node 14 of the first switching element 10 is applied to the negative potential, thereby enabling a high or low signal to be generated at the control input 22 of the control device 11. As a result, the control device 11 will be able to detect the state of the switching elements 10 and 18 for all functions, in other words for the polarity reversal protection and/or load detection. With an electronic circuit design of this type, the two switched states of the switching elements 10 and 18 can be detected on the basis of only one signal, i.e. a high or low signal, since the two switching elements 10 and 18 are always in a complementary switched state, i.e. when the second switching element 18 is activated, the first switching element 10 is deactivated and vice versa.

To enable the control device 11 to activate the second switching element 18, the control device 11 has a control output 24 connected to the control node 21 of the second switching element 18, preferably via a resistor 25. By means of this connection, the control device 11 can control the second switching element 18 by applying a signal to the control node 21. This can be operated in such a way, for example, that when the first switching element 10 is deactivated by the control device 11 on expiry of a pre-set period, the second activated switching element 18 is deactivated by transmitting a negative signal, so that the voltage applied to the control node 14 of the first switching element 10 activates the first switching element 10 again. This switching sequence can be repeated by the control device 11 any number of times to enable the first switching element 10 to be periodically switched on and off. Naturally, the system could be set up so that, after a pre-defined number of switching sequences, the control device 11 does not initiate a further switching sequence and an error signal is put out.

In order to be able to operate a load detection system, the control device 11 automatically controls the switching elements 10 and 18. For load detection purposes, the control device 11 firstly deactivates the first switching element 10 by activating the second switching element 18 and, on expiry of a pre-set period, activation of the second switching element 18 is terminated so that, if a consumer 9 is connected, a voltage will appear at the control node 21 of the second switching element 18, in which case the first switching element 10 will remain deactivated, due to the voltage appearing at the control node 21. This is detected by the control device 11 at the control input 22 and indicates that a consumer 9 is connected. By adopting this approach, it is possible to connect an ohmic resistor or other circuits groups or devices as consumers 9.

To enable the control device 11 to detect an accumulator 3 at the output terminals 7, 8, another control procedure is necessary in addition to that described above. This is necessary because, when an accumulator 3 is connected at the same voltage level as the output voltage. of the charger device 2, no voltage is registered across the resistor 20 at the control node 21 of the other switching element 18 and it is not possible to operate a self-holding function.

To operate a load detection of an accumulator 3, whilst the first switching element 10 is deactivated, the control device 11 raises the output voltage at the output terminals 7, 8 from the charger device 2 by a certain amount, in particular between 1V and 5V, causing the control device 11 to terminate activation of the second switching element 18, as a result of which, when an accumulator 3 is connected, voltage is applied to the control node 21 of the second switching element 18 because of the voltage difference between the accumulator voltage and the output voltage of the charger device 2, and the second switching element 18 will therefore remain active because of the self-holding function, as described above, and this will in turn be detected by the control device 11 at the control input 22.

It should be pointed out that the polarity reversal protection can be operated independently of any intervention from the control device 11, whereas in the case of the overload protection and/or load detection, the control device 11 must be used, so that these functions are run or repeated after the charger device 2 has been switched.

FIG. 2 illustrates another embodiment operating on the same principles and control sequences as those described with reference to FIG. 1.

The difference is that the control node 14 of the first switching element 10 is directly connected to a control output 26 of the control device 11, so that the connecting line illustrated in FIG. 1 to the other switching element 18 and hence to the supply voltage 16 or to the output voltage of the charger device 2 is interrupted.

To enable the polarity reversal protection, the overload protection and/or the load detection system, to be run by the charger device 2, the switching element 10 will have to be controlled from the control device 11, i.e. in accordance with the operating sequence described with regard to FIG. 1, the control device deactivates the switching element 10 when the switching element 18 is activated and vice versa. Such a control system can be operated by the control device 11 because the control device 11 is able to detect the switched state of the second switching element 18 at the control input 22 and the first switching element 10 can be controlled accordingly by the control device 11.

What is claimed is:

1. A charger for an accumulator, comprising a power source, a charging device connected by input terminals to the power source and by output terminals to the accumulator, the power supplied by the power source being converted from an AC voltage to a DC voltage and the converted power being delivered by the output terminals to the accumulator, and an output side protection circuit for overload protection and polarity reversal protection against incorrect polarity of the accumulator, the protection circuit being connected to one of the output terminals and including a first switching element connected to the one output terminal and a negative potential of the charging device and establishing a connection between the one output terminal and the negative potential if a correct, negative polarity appears at the one output terminal, and interrupting the connection if an incorrect, positive polarity appears at the one output terminal, a control node of the first switching element connected by a conductor to a second switching element to which the negative potential of the charging device is connected; and the charging device further including a control device having a control input terminal and a control output terminal, the control input terminal being connected with a positive potential of a supply voltage source so that the second switching element is activated if an incorrect positive polarity appears at the one output terminal or too high a current flows through a conductor between the one output terminal and a control node of the second switching element, causing the first switching element to be deactivated, due to the connection established by the second switching element between the supply voltage source and the negative potential of the charging device, the switched state of the first switching element being determined by the switched state of the second switching element, and the control output terminal being connected to the control node of the second switching element for controlling the further switching element.

2. The charger device of claim 1, wherein the supply voltage source is the positive potential of the charging device.

3. The charger device of claim 1, wherein the supply voltage source is the output voltage of the charging device at the other one of the output terminals.

4. The charger device of claim 1, wherein the supply voltage source is independent of the charging device.

5. The charger device of claim 1, further comprising a drain node of the first switching element connected to the one output terminal and to the control node of the further switching element.

6. The charger device of claim 1, wherein the control node of the first switching element and the conductor of the second switching element are connected to the control device of the charger device.

7. The charger device of claim 1, wherein the control node of the first switching element is connected to the supply voltage source and receives voltage therefrom.

8. The charger device of claim 1, wherein the control node of the first switching element is connected to another one of the output terminals, receiving the output voltage of the other output terminal, causing the first switching element to be activated when the accumulator is connected to the correct polarity across the output terminals even if the power source is disconnected from the input terminals.

9. A method of controlling a charger for an accumulator connected to input terminals to a power source to supply power to the charging device, comprising the steps of converting the supplied power from an AC voltage to a DC voltage, and supplying the converted power to output terminals connected to the accumulator; connecting an output side protection circuit for overload protection and polarity reversal protection to one of the output terminals, operating a first switching element in the protection circuit to maintain a connection between the one output terminal and a negative potential of the charging device if a correct, negative polarity appears at the one output terminal, and to interrupt the connection if an incorrect, positive polarity appears at the one output terminal, activating the first switching element when the charging device is connected to the input terminals of the power supply source even when the accumulator is not connected to the output terminals whereby the incorrect polarity protection is activated, and activating a second switching element in the protection circuit if an incorrect positive polarity appears at the one output terminal or too high a current flows through a conductor between the one output terminal and a control node of the second switching element, and causing a supply voltage applied to a control node of the first switching element to be applied to the negative potential and to deactivate the first switching element.

10. The method of claim 9, comprising the step of activating the first switching element by the second switching element for overload protection when the correct polarity appears at the output terminals and too high a current flows through the first switching element.

11. The method of claim 9, comprising the step, for overload protection, of periodically switching the first switching element on and off until the current flow through the first switching element and the voltage at the control node of the second switching element fall below a defined value, whereby the further switching element is prevented from being activated.

12. The method of claim 9, comprising the steps of deactivating the second switching element and automatically reactivating the first switching element after the first switching element has been deactivated on expiry of a pre-set time by a control device of the charger device.

13. The method of claim 12, comprising the steps of first deactivating the first switching element by the control device by activating the second switching element and, on the expiry of a pre-set time, deactivating the second switching element, applying a voltage to the control node of the second switching element if the accumulator is connected, causing the first switching element to remain deactivated, and detecting the deactivation of the first switching element by the control device.

14. The method of claim 12, comprising the steps of increasing the output voltage at the output terminals by the charger device by a defined amount, deactivating the second switching element by the control device so that, if the accumulator is connected, a voltage appears at the control node of the second switching element, and detecting the activation of the second switching element by the control device.

15. The method of claim 12, comprising the step of detecting the deactivation of the first switching element and an activation of the second switching element by the control input terminal of the control device, and applying the voltage at the control node of the first switching element to the negative potential.

* * * * *